United States Patent
Soutar et al.

(10) Patent No.: US 6,219,794 B1
(45) Date of Patent: Apr. 17, 2001

(54) METHOD FOR SECURE KEY MANAGEMENT USING A BIOMETRIC

(75) Inventors: Colin Soutar, Scarborough; Danny B. Roberge; Alexei Stoianov, both of Toronto; Rene M. Gilroy, North York, all of (CA); Vijayakumar Bhagavatula, Pittsburgh, PA (US)

(73) Assignee: Mytec Technologies, Inc., Ontario (CA)

( * ) Notice: Subject to any disclaimer, the term of this patent is extended or adjusted under 35 U.S.C. 154(b) by 0 days.

(21) Appl. No.: 08/947,224

(22) Filed: Oct. 8, 1997

(30) Foreign Application Priority Data

Apr. 21, 1997 (CA) .................................................. 2203212

(51) Int. Cl.⁷ .................................................. G06F 12/14
(52) U.S. Cl. .......................................... 713/202; 713/186
(58) Field of Search .................................. 382/124, 125, 382/115, 280, 260; 713/186, 202

(56) References Cited

U.S. PATENT DOCUMENTS

| | | | |
|---|---|---|---|
| 3,716,301 | 2/1973 | Caulfield et al. | 356/165 |
| 3,771,129 | 11/1973 | McMahon | 340/146.3 E |
| 4,532,508 | 7/1985 | Ruell | 382/4 |
| 4,837,843 | 6/1989 | Owechko | 382/31 |
| 4,876,725 | 10/1989 | Tomko | 382/126 |
| 4,993,068 | 2/1991 | Piosenka et al. | 380/23 |
| 5,040,140 | 8/1991 | Horner | 364/822 |
| 5,050,220 | 9/1991 | Marsh et al. | 382/124 |
| 5,095,194 | 3/1992 | Barbanell | 235/379 |
| 5,138,468 | 8/1992 | Barbanell | 359/2 |
| 5,148,157 | 9/1992 | Florence | 340/783 |
| 5,150,229 | 9/1992 | Takesue et al. | 359/7 |
| 5,159,474 | 10/1992 | Franke et al. | 359/29 |
| 5,214,534 | 5/1993 | Kallman et al. | 359/561 |
| 5,245,329 | 9/1993 | Gokcebay | 340/825.31 |

(List continued on next page.)

FOREIGN PATENT DOCUMENTS

| | | |
|---|---|---|
| 4243908 A1 | 6/1994 | (DE) . |
| 0 396 774 | 11/1991 | (EP) . |
| 2 132 857 | 7/1984 | (GB) . |
| WO 9608093 | 3/1996 | (WO) . |

OTHER PUBLICATIONS

"Optical Image Encryption Using Input Plane and Fourier Plane Random Encoding", Philippe Refregier, and Bahram Javidi, SPIE vol. 2565(1995), pp. 62–68.

"Novel Applications of Cryptography in Digital Communications", Jim. K. Omura, IEEE Communications Magazine, vol. 28, 1990, pp. 21–29.

Javidi B. et al: "Fully Phase Encoded Key and Biometrics for Security Verification" Optical Engineering, vol. 36, No. 3, Mar. 1997, pp. 935–941, Bellingham (US).

Soutar C. et al.: "Biometric Encryption™ using Image Processing" Optical Security and Counterfeit Deterence Techniques II, San Jose, CA, USA, Jan. 28–30, 1998, vol. 3314, pp. 178–188 (Proceedings of the SPIE—The International Society for Optical Engineering, 1998, SPIE–Int. Soc. Opt. Eng. USA).

*Primary Examiner*—Tod Swann
*Assistant Examiner*—Matthew Smithers
(74) *Attorney, Agent, or Firm*—Marshall, O'Toole, Gerstein, Murray & Borun (57) ABSTRACT

This invention describes a secure method for consistently reproducing a digital key using a biometric, such as a fingerprint. The digital key is linked to the biometric only through a secure block of data, known as the protected filter. The key cannot be released from the protected filter other than via the interaction with the correct biometric image. Once generated, the digital key may be used in a system as an encryption/decryption key, or as a personal identification number (PIN).

28 Claims, 4 Drawing Sheets

U.S. PATENT DOCUMENTS

| | | | |
|---|---|---|---|
| 5,268,963 | 12/1993 | Monroe et al. | 380/23 |
| 5,280,527 | 1/1994 | Gullman et al. | 380/23 |
| 5,327,286 | 7/1994 | Sampsell et al. | 359/561 |
| 5,343,415 | 8/1994 | Itoh et al. | 364/725 |
| 5,345,508 | 9/1994 | Lynn et al. | 380/46 |
| 5,347,375 | 9/1994 | Saito et al. | 359/9 |
| 5,386,378 | 1/1995 | Itoh et al. | 364/822 |
| 5,418,380 | 5/1995 | Simon et al. | 250/550 |
| 5,428,683 | 6/1995 | Indeck et al. | 380/4 |
| 5,469,506 | 11/1995 | Berson et al. | 380/23.9 |
| 5,541,994 | 7/1996 | Tomko et al. | 380/30 |
| 5,680,460 * | 10/1997 | Tomko et al. | 713/186 |
| 5,712,912 * | 1/1998 | Tomko et al. | 713/186 |
| 5,740,276 * | 4/1998 | Tomko et al. | 382/210 |
| 5,761,330 * | 6/1998 | Stoianov et al. | 382/127 |
| 5,915,034 * | 6/1999 | Nakajima et al. | 382/124 |
| 5,974,188 * | 10/1999 | Ibenthal | 382/249 |

* cited by examiner

METHOD FOR SECURE KEY MANAGEMENT USING A BIOMETRIC

BACKGROUND OF THE INVENTION

While many forms of encryption/decryption algorithms (cipher systems) exist today, a weak link of all systems is the secure management of the encryption/decryption key. There are basically two types of cipher systems: those based on a single symmetric key, and those based on two distinct public/private keys. A symmetric key algorithm uses a single key to both encrypt and decrypt the data. These algorithms are usually fast and their security lies entirely in maintaining secrecy of the symmetric key. Two problems with these systems are the transportation of the key from the sender to the intended recipient, and the secure storage of the symmetric key. A public/private key system uses a two key method. The public key is used for encryption and can be distributed over open channels. Because the public key can be sent over open channels, the inconvenience and security risk associated with key transportation is minimized. However, the private key is still used to decrypt the information, and thus must be kept secret.

In the age of electronic transactions, PIN's have become the dominant method by which these encryption keys are secured. The encryption keys are then only as secure as the length of the PIN, as the PIN recalls or decrypts the encryption key. The length of a PIN which can easily be remembered is limited; thus the security of the system is also limited. PIN's are now, of course, prevalent in many other areas of life, such as banking, access control, and as an identification means for social programs. As the number of PIN's that one needs to remember/store escalates, the potential for a security breach arises. This invention overcomes the need to carry, store, or remember private keys for encryption/decryption, or PIN's for any other application by deriving a digital key from a biometric, during a live verification process.

SUMMARY OF THE INVENTION

In the present invention, the digital key is linked to the biometric only through a secure block of data known as the protected filter. The correct key will only be derived via the interaction of this protected filter with the correct user biometric. For a biometric to be used conveniently and securely in a method to recover a digital key from a protected filter, the method should possess the following four features:

1) Preferably, the method should be capable of producing an arbitrary M-bit digital key in conjunction with the biometric.
2) The same M-bit digital key should be released each time the system is used by the authorized holder of the protected filter.
3) Preferably, no key should be released when an unauthorized user of the protected filter attempts to use the system.
4) The protected filter, as an independent data block, has to be resilient to "attack".

In German patent DE 42 43 908 A1 to Bodo, a method was proposed for extracting a digital key directly from a biometric. While the invention of Bodo thus provides a method for producing a digital key from a biometric, the security of such a system is irrevocably lost if the digital key is ever compromised. For this reason, feature 1 above is preferred; i.e. for a system to remain secure, there should be the ability to change the digital key. The invention described herein proposes a method for linking a key to the biometric, rather than directly deriving the key from the biometric; thus the key can be changed at any time simply by re-enrolling the user and recreating the protected filter.

Methods have been described to re-generate signals using a biometric, based on the use of conventional matched filters in correlators. It is well known by those skilled in the art that a matched filter does not allow a trade-off between distortion tolerance and discrimination. Thus, in a system using a matched filter, it is impossible to optimally comply with both features 2 and 3 above. Also, it is known that the extraneous terms produced at the output of a system using a matched filter eliminate the possibility of exactly reproducing a block of pre-determined data. Thus, known methods using matched filters do not easily accommodate feature 1 above. Furthermore, the impulse response of a matched filter will usually reveal enough information about the biometric for an "attacker" to recreate the biometric, and thus the signals. Therefore, a matched filter approach does not possess feature 4.

According to the present invention, there is provided a method for securely recovering a digital key, comprising the steps of: capturing at least one biometric image; obtaining transformed image information comprising transforming said at least one biometric image to a transform domain; retrieving a protected filter from storage, said protected filter comprising a phase-only filter; applying said transformed image information to said phase-only filter to obtain verification information; and obtaining a digital key from said verification information.

According to another aspect of the invention there is provided a method of linking a binary one-dimensional key having M elements with a given two-dimensional complex valued array comprising the steps of:

(i) concatenating real and imaginary parts of said complex valued array to form a concatenated two-dimensional array;
(ii) ranking positive elements and negative elements of said concatenated array by magnitude;
(ii) storing row and column indices of said ranked positive elements in a positive locations vector and row and column indices of said ranked negative elements in a negative locations vector; and
(iv) for each one of the M elements of said key, extracting L elements from said negative location vector if said one key bit is a zero and extracting L elements from said positive location vector if said one bit is a one to generate a two-dimensional link array having L rows and M columns.

According to another aspect of the present invention, there is provided a method for generating a protected filter, comprising the steps of: capturing at least one biometric image; obtaining transformed image information comprising transforming said at least one biometric image to a transform domain; generating a random phase-only function; obtaining a complex conjugate of the phase component of said transformed image information; multiplying said phase-only function with said complex conjugate to generate a phase-only filter; and storing a protected filter, said protected filter comprising said phase-only filter.

According to yet another aspect of the present invention, there is provided a method for secure user verification, comprising the steps of: capturing at least one biometric image; obtaining transformed image information comprising transforming said at least one biometric image to a transform domain; obtaining magnitude information from said transformed image information; retrieving a phase-only filter from storage; applying at least said magnitude information to said phase-only filter to obtain a transitory filter with phase and magnitude information; multiplying said transformed image information with said transitory filter to obtain verification information; comparing said verification information with a retrieved reference pattern and, on obtaining a satisfactory match, providing a user verification signal.

BRIEF DESCRIPTION OF THE DRAWINGS

In the figures which illustrate a preferred embodiment of this invention.

DESCRIPTION OF THE PREFERRED EMBODIMENTS

This invention describes a method which firstly, reliably produces a two-dimensional array, c(x), using biometric images in conjunction with a protected filter, and secondly, describes a method for linking elements from c(x) to an M-bit digital key, k. The key, k, is only extracted correctly when the correct biometric is combined with the correct protected filter. The key, k, may be used directly as an encryption/decryption key or as a PIN in security or communication systems.

In the preferred embodiment, the two-dimensional array, c(x), will be formed via the interaction of a fingerprint with a filter function, stored within the protected filter. In the first embodiment, the filter function is designed for a Fourier transform processor. Neither the filter function nor the fingerprint alone is capable of producing c(x). From the c(x) array, a digital key, k, is extracted. Once k has been extracted, it is used in conjunction with both an encryption algorithm and a hashing algorithm in order to produce an identification code id. The ID-code id will then be compared with a previously stored value $id_0$ to determine the validity of the key, before it is released into the encryption system, or other application. The process for obtaining the identification code is as follows. Based on the required input block size of the chosen encryption algorithm, S bits from the protected filter will be encrypted using the generated key k. The resulting ciphertext block will then become the input to a one-way hash function which produces the identification code id. Since the hash algorithm is one-way, the id value cannot be transformed back into the key k.

Examples proposed for the aforementioned encryption algorithm and hash algorithm are the International Data Encryption Algorithm (IDEA) and the Secure Hash Algorithm (SHA), respectively. Note that using both an encryption algorithm and a hash algorithm provides more security than simply storing the hash value of the generated key alone. This is because the S bits that are chosen from the protected filter and encrypted using k will be unique for each user. Thus, an attacker who sought to obtain a "universal" look-up table of the relationship between k and id (so that he could extract $id_0$ from the protected filter, and thus determine $k_0$ for a particular user), would have to compute all possible permutations of encrypting S-bit messages with M-bit keys. The computational and memory resources required to generate such a look-up table makes such an attack infeasible.

1) Design of the Filter Function
1.1) Filter Function Strategy

The filter function is designed to be tolerant to distortions of the fingerprint, so that it accommodates the natural variations that are apparent in biometric images over any significant period of time. Therefore, the filter function will be constructed using a set of T training images. It is assumed that the set of training images is sufficient to encompass all of the expected distortions of the fingerprint. The filter function will be calculated during an enrollment session using a series of training images. The filter function is to be used during a verification session using a series of non-training images. The filter function is designed for a legitimate user, and should be inappropriate for use with a nonlegitimate user, or "attacker".

The following typeface convention is used:
y(x)—two-dimensional array in image domain
Y(u)—two-dimensional array in Fourier domain
Y—one-dimensional vector containing float or integer (non-binarized) data
y—one-dimensional vector containing binarized data
Y—scalar Denote the T images of the biometric by $\{f_0^1(x), f_0^2(x), \ldots, f_0^T(x)\}$, where the subscript 0 denotes a training set image.

The filter function that will be constructed using these images is denoted by H(u). Note that we may refer to complex-valued functions such as H(u) independently by their magnitude and/or phase components, denoted by $|H(u)|$ and $e^{i\phi_H(u)}$, respectively, where $i=\sqrt{-1}$.

The system output in response to $f_0^t(x)$ is given by $c_0^t(x)$.
The Fourier transform of $c_0^t(x)$ is given by $C_0^t(u) \equiv F_0^t(u) \cdot H(u)$, where $F_0^t(u)$ is the Fourier transform of the training image, $f_0^t(x)$.

The desired output pattern that we require from the system is denoted by $g_0(x)$.
1.2) Filter Function Criteria We define two criteria, which will be used to optimize the filter function. We will use error terms that relate to two requirements for the filter function: that it consistently produces the same output pattern for a legitimate user, and that it is tolerant to distortions presented in the input images.

For $1 \leq t \leq T$, we require that $c_0^t(x) \approx g_0(x)$, i.e. the output pattern should be as close to $g_0(x)$ as possible for each image, $f_0^t(x)$, in the training set.

We can define an error term, $E_{similarity}$, such that:

$$E_{similarity} = \frac{1}{T} \sum_{t=1}^{T} \int |c_0^t(x) - g_0(x)|^2 dx \qquad (1)$$

The term $E_{similarity}$ is thus defined using an arbitrary function, $g_0(x)$, rather than a delta function, as is normally done in the process of correlation. Also, we wish to minimize the error due to distortion in the input images, i.e.:

$$\left. \begin{array}{l} \text{If } f_0^t(x) = f_0^s(x) + \varepsilon_{input}^{t,s}(x), \\ \text{then } c_0^t(x) = c_0^s(x) + \varepsilon_{output}^{t,s}(x) \end{array} \right\} \text{ For } s, t \in \{1, \ldots, T\}, \text{ and } t \neq s \qquad (2)$$

Assuming that $\varepsilon_{input}^{ts}(x)$ do not correlate with $f_0^s(x)$ and with each other, it can be shown that the variance of the error term due to the additive distortion or changes in $f_0^t(x)$ is given by:

$$E_{noise} = \int |H(u)|^2 P(u) du \qquad (3)$$

where;

$$P(u) = \text{average over } t \text{ and } s \text{ of } |FT\{\varepsilon_{input}^{t,s}(x)\}|^2, \text{ where } s \neq t \qquad (4)$$

i.e. $P(u)$ represents the power spectrum of the change between the fingerprints in the training set. In general $P(u)$ is readily approximated by a function which characterizes the type of object for which the filter is designed. $P(u)$ may take the form of a Gaussian function. For fingerprint images, we find that $P(u)$ may also take the form of a simple array whose elements all have unity value. In general, the form of $P(u)$ will be fixed for all users of the system, although it could also be user-specific.

Note that by Parseval's theorem, $$E_{similarity} = \frac{1}{T} \sum_{t=1}^{T} \int |C_0^t(u) - G_0(u)|^2 du \qquad (5)$$

The term $E_{similarity}$ characterizes the similarity of system output in response to each of the training set images, and the term $E_{noise}$ characterizes the effect of image-to-image variation. Thus, $E_{similarity}$ determines how selective (or discriminating) the filter function is, and $E_{noise}$ determines how tolerant it is to the expected distortions in the biometric images.

1.3) Filter Definition

We wish to derive a filter that minimizes the total error, $E_{total}$.

$$E_{total} = \alpha E_{noise} + \sqrt{1-\alpha^2} E_{similarity}, \quad 0 \leq \alpha \leq 1 \qquad (6)$$

By allowing $\alpha$ to vary between 0 and 1, we can minimize $E_{noise}$ (for $\alpha=1$) to maximize the distortion tolerance of the filter; or minimize $E_{similarity}$ (for $\alpha=0$) to maximize the discrimination capability; or optimize for some combination of the two (for $0<\alpha<1$).

Substituting the filter constraints defined above yields $$E_{total} = \alpha \int |H(u)|^2 P(u) du + \sqrt{1-\alpha^2} \frac{1}{T} \sum_{t=1}^{T} \int |C_0^t(u) - G_0(u)|^2 du \qquad (7)$$

where, as aforenoted $$C_0^t(u) = F_0^t(u) \cdot H(u) \qquad (8)$$

We wish to minimize $E_{total}$ with respect to $H(u)$. To solve this variational problem, we have to obtain a partial derivative of the expressions inside the integrals over $H(u)$ and set this derivative to zero. Thus:

$$\sqrt{1-\alpha^2} \frac{1}{T} \sum_{t=1}^{T} [F_0^{*t}(u)H^*(u) - G_0^*(u)]F_0^t(u) + \alpha H^*(u)P(u) = 0 \qquad (9)$$

Solving equation (9) for $H(u)$ yields;

$$H(u) = \sqrt{1-\alpha^2} \frac{\left[\frac{1}{T} \sum_{t=1}^{T} F_0^{*t}(u)\right] G_0(u)}{\left\{\alpha P(u) + \sqrt{1-\alpha^2} \frac{1}{T} \sum_{t=1}^{T} |F_0^t(u)|^2\right\}} \qquad (10)$$

Note that $P(u) \equiv P^*(u)$, where * denotes complex conjugate.

This defines the filter function that is optimized with respect to the two error terms that were defined in the filter function criteria section. It is convenient to define the following terms:

$$A_0(u) = \frac{1}{T} \sum_{t=1}^{T} F_0^t(u) \qquad (11)$$

$$D_0(u) = \frac{1}{T} \sum_{t=1}^{T} |F_0^t(u)|^2 \qquad (12)$$

Thus, $$H(u) \propto \frac{A_0^*(u) G_0(u)}{\alpha P(u) + \sqrt{1-\alpha^2} D_0(u)} \qquad (13)$$

Further, we re-write equation (13) as:

$$H(u) = H_F(u) G_0(u) \qquad (14)$$

where the constant scalar $(1-\alpha^2)^{1/2}$ has been ignored. The expression $H_F(u)$ contains all of the terms of the filter relating to the training set of fingerprint images, and $G_0(u)$ is the Fourier transform of $g_0(x)$. Note that equation (14) defines a filter $H(u)$ that is optimized for any function for $G_0(u)$. We seek to choose a $G_0(u)$ that provides maximum security of $H(u)$.

The term $\alpha$ in $H(u)$ provides a trade-off between the discrimination capability and distortion tolerance of the filter. Thus, $\alpha$ can be used to produce a tighter or more forgiving system, depending on the requirements. The value of $\alpha$ is generally determined by testing the performance of filters using a large database of images. The parameter $\alpha$ may be universal, in which case it is stored in the system, or it may be user-dependent, in which case it will be stored as part of the protected filter.

1.4) Security of Protected Filter

One of the main requirements of the system is that the protected filter must be immune to attack, i.e. neither the biometric image, f(x), nor the system output, $g_0(x)$, should be recoverable from the protected filter. Note that at this point the form of the protected filter has not yet been defined. Thus, we have the freedom to choose the form of $G_0(u)$ to maximize the security of the protected filter. Security is found to be maximized when $G_0(u)$ is a random, uniformly distributed phase function, and only the phase of $H_F(u)$, denoted, $$e^{i\phi_{H_F}(u)},$$

is stored. The protected filter thus comprises the product of $$e^{i\phi_{H_F}(u)}$$

and a random phase-only function. The following text demonstrates the "perfect secrecy" of the protected filter. Perfect secrecy in this sense implies that given the protected filter, neither of the two elements comprising this filter can be reconstructed.

Theorem 1: (see D. Stinson. *Cryptography: Theory and Practice*, CRC Press, New York, 1995) Suppose a cipher system has been defined such that the size of: the keyspace (K), the plaintext space (P), and the ciphertext space (C), are all equal. Then this cipher system provides perfect secrecy if and only if:
1. every key is used with probability equal to 1/|K|, where |K| denotes the size of the keyspace, and
2. for every element x∈P, and every element y∈C, there exists a unique key k∈K such that the encryption of x with k produces the ciphertext y (i.e. $e_k(x)=y$ ).

The above theorem will apply to a cipher system based on the operation of addition modulo $2\pi$ if it is assumed that each key k in the keyspace K is equiprobable. In other words, any key k∈K has an equal probability of being chosen as the key. In reality what this implies is that the random number generator being used to produce k is devised in such a way that it does not impose an unequal probability distribution on the keyspace, which would inevitably compromise security. This implies that the random number generator used to provide keys for the following encryption system must choose a random key k in the keyspace K based on an equiprobable distribution.

Note: $[0,2\pi)^r$ used in the following lemma implies an r element string where each element can take on the values j such that $0 \leq j < 2\pi$.

Lemma 1: The cipher system defined such that P=C=K= $[0,2\pi)^r$ and based on the operation of addition modulo $2\pi$ with randomly generated keys has perfect secrecy.

Proof: The elements of P, C, and K are defined as a string (or array) of r floating point elements where each element falls within the range of 0 to $2\pi$. For simplicity consider $\beta$ as the number of possibilities in the space $[0,2\pi)$ when taking into account the floating-point precision level. Then we have $|K|=|C|=|P|=\beta^r$. Enforcing the above assumption we have that every key has a probability of 1/|K| of being chosen. We are left to prove that for every x∈P and every y∈C, there is a unique key k such that $e_k(x)=y$. Since $y=e_k(x)=(x+k) \mod 2\pi$, if we fix x and y we can solve for k uniquely using the equation: $k=(y-x) \mod 2\pi$.

Thus we have that a cipher system based on addition mod $2\pi$ has perfect secrecy.

What is important in the above discussion to the concept of secure key management using a biometric is the fact that the product of two phase-only arrays is equivalent to an addition mod $2\pi$. Because of this equivalence relationship the above Lemma also applies to a cipher system based on the product of two phase-only arrays. Thus we have the following:

Lemma 2: The cipher system defined such that P=C=K= $\{e^{i\beta}\}^r$, where $\{e^{i\beta}\}^r$ is an r element string and $\beta=[0,2\pi)$, based on the operation of multiplication with randomly generated keys, has perfect secrecy.

While it was shown above that saving only the phase of $H_F(u)$ allows excellent security of the protected filter to be obtained when combined with a random phase array, the optimal filter defined by equation (14) requires that the magnitude term, $|H_F(u)|$, is used during generation of the output pattern, c(x), for optimal consistency of c(x). The method proposed in the following section addresses both of these requirements:

1.5) Protected Filter Format

In this section, we describe a method for simultaneously satisfying the need for magnitude information in the filter function and maintaining security of the protected filter.

Consider generating an array, $G_0(u)$, whose elements have unity magnitude, i.e., $G_0(u)$ is a phase-only function and whose phase values, j, are random and uniformly distributed such that $0 \leq j < 2\pi$, i.e.:

$$G_0(u) = e^{i\phi_{G_0}(u)} = e^{i2\pi U[0,1)} \tag{15}$$

where U[0, 1) represents an array of elements whose value, j, is randomly and uniformly distributed such that $0 \leq j < 1$. Note that in the discussion which follows, we will use $$e^{i\phi_{G_0}(u)}$$

to essentially represent the random phase only function defined above. Thus using this expression to represent $G_0(u)$ and using the set of training images, $f_0^t(x)$, calculate H(u) using equation (14).

$$H(u) = \frac{A_0^*(u)}{\alpha P(u) + \sqrt{1-\alpha^2} D_0(u)} e^{i\phi_{G_0}(u)} \tag{16}$$

H(u), was optimized to produce a consistent $c_0(x)$ (and as close to $g_0(x)$ as is possible) when a member of the training image $f_0^t(x)$ is presented to the system. The resulting output, $c_0(x)$ is given by;

$$c_0(x) = FT^{-1}\left\{F_0(u) \frac{|A_0(u)|e^{-i\phi_{A_0}(u)}}{\alpha P(u) + \sqrt{1-\alpha^2} D_0(u)} e^{i\phi_{G_0}(u)}\right\} \tag{17}$$

The expected output, $c_1(x)$, from the system when a non-training image (i.e. during verification) is present is given by:

$$c_1(x) = FT^{-1}\left\{F_1(u)\frac{|A_0(u)|e^{-i\phi_{A_0}(u)}}{\alpha P(u) + \sqrt{1-\alpha^2}\, D_0(u)}e^{i\phi_{G_0}(u)}\right\} \quad (18)$$

where the subscript 1 represents a set of images used in verification. Clearly, we desire that $c_1(x)$ is as close to $c_0(x)$ as possible, for the legitimate user. Of course, $c_1(x) \to c_0(x)$ if the testing image, $f_1(x)$, is identical to the training image, $f_0(x)$. We find that as the number of fingerprints, T, in the training set increases, $A_0(u)$ converges to a fixed function (at about T=6). Because the training set of enrollment images are captured in the same way as the subsequent verification images, at T=6, $|A_1(u)| \cong |A_0(u)|$ and $D_1(u) \cong D_0(u)$, i.e. the average of the set of verification images tends to the average of the set of enrollment images. Therefore, in equations (17) and (18), we use $A_0(u)$ to represent $F_0(u)$, and $A_1(u)$ to represent $F_1(u)$, i.e. we use the average of the fingerprint transforms to represent the individual fingerprints. To ensure that we never have to store any magnitude information in the filter (for optimal security, we wish to store only phase terms), we also approximate $|A_0(u)|$ by $|A_1(u)|$ and $D_0(u)$ by $D_1(u)$ in equation (18) to yield:

$$c_0(x) = FT^{-1}\left\{\frac{|A_0(u)|^2}{\alpha P(u) + \sqrt{1-\alpha^2}\, D_0(u)}e^{i\phi_{G_0}(u)}\right\} \quad (19)$$

and $$c_1(x) = FT^{-1}\left\{\frac{|A_0(u)|e^{-i\phi_{A_0}(u)}}{\alpha P(u) + \sqrt{1-\alpha^2}\, D_1(u)}e^{i\phi_{A_1}(u)}e^{-i\phi_{A_0}(u)}e^{i\phi_{G_0}(u)}\right\} \quad (20)$$

It can be seen from equations (19) and (20) that this procedure could be used to satisfy both the constraints that phase-only functions are saved, and that magnitude terms are used to preserve the consistency of the output $c(x)$ patterns. For example, if we re-write the equations as:

$$c_0(x) = \quad (19)$$
$$FT^{-1}\left\{|A_0(u)|e^{i\phi_{A_0}(u)}\frac{|A_0(u)|}{\alpha P(u) + \sqrt{1-\alpha^2}\, D_0(u)}e^{-i\phi_{A_0}(u)}e^{i\phi_{G_0}(u)}\right\}$$

and $$c_1(x) = \quad (20)$$
$$FT^{-1}\left\{|A_1(u)|e^{i\phi_{A_1}(u)}\frac{|A_1(u)|}{\alpha P(u) + \sqrt{1-\alpha^2}\, D_1(u)}e^{-i\phi_{A_0}(u)}e^{i\phi_{G_0}(u)}\right\}$$

Thus, if we store only the product of the phase of the complex conjugate of the training set images, $$e^{-i\phi_{A_0}(u)},$$

and the phase-only function, $$e^{i\phi_{G_0}(u)}$$

i.e.

$$H_{stored}(u) = e^{-i\phi_{A_0}(u)}e^{i\phi_{G_0}(u)} \quad (21)$$

and we recreate the magnitude terms of the filter "on-the-fly" during either enrollment or verification, then the security and consistency aspects are simultaneously obtained. Thus, during the processes of enrollment and verification we create transitory filters, $$\frac{|A_0(u)|}{\alpha P(u) + \sqrt{1-\alpha^2}\, D_0(u)}H_{stored}(u), \text{ and } \frac{|A_1(u)|}{\alpha P(u) + \sqrt{1-\alpha^2}\, D_1(u)}H_{stored}(u),$$

respectively, which contain both magnitude and phase information and which are used to calculate $c_0(x)$ and $c_1(x)$, respectively, although only the phase information is ever stored. The method of generating the filter magnitude terms will be described completely in Section 2.2. The preferred method for securely linking a requested key to the array $c(x)$ is presented in the next section. Note that the security of the system may be further enhanced by saving and utilizing only the top (or bottom) portions of the arrays $H_{stored}(u)$, $A(u)$ and $D(u)$ above to produce the $c(x)$ output functions. This will eliminate any potential problems associated with the symmetry properties of $A(u)$ and $D(u)$.

Secure Key Generation 2.1) Enrollment

The secure generation of the digital key is described with reference to FIGS. 1–4.

Figure 1:
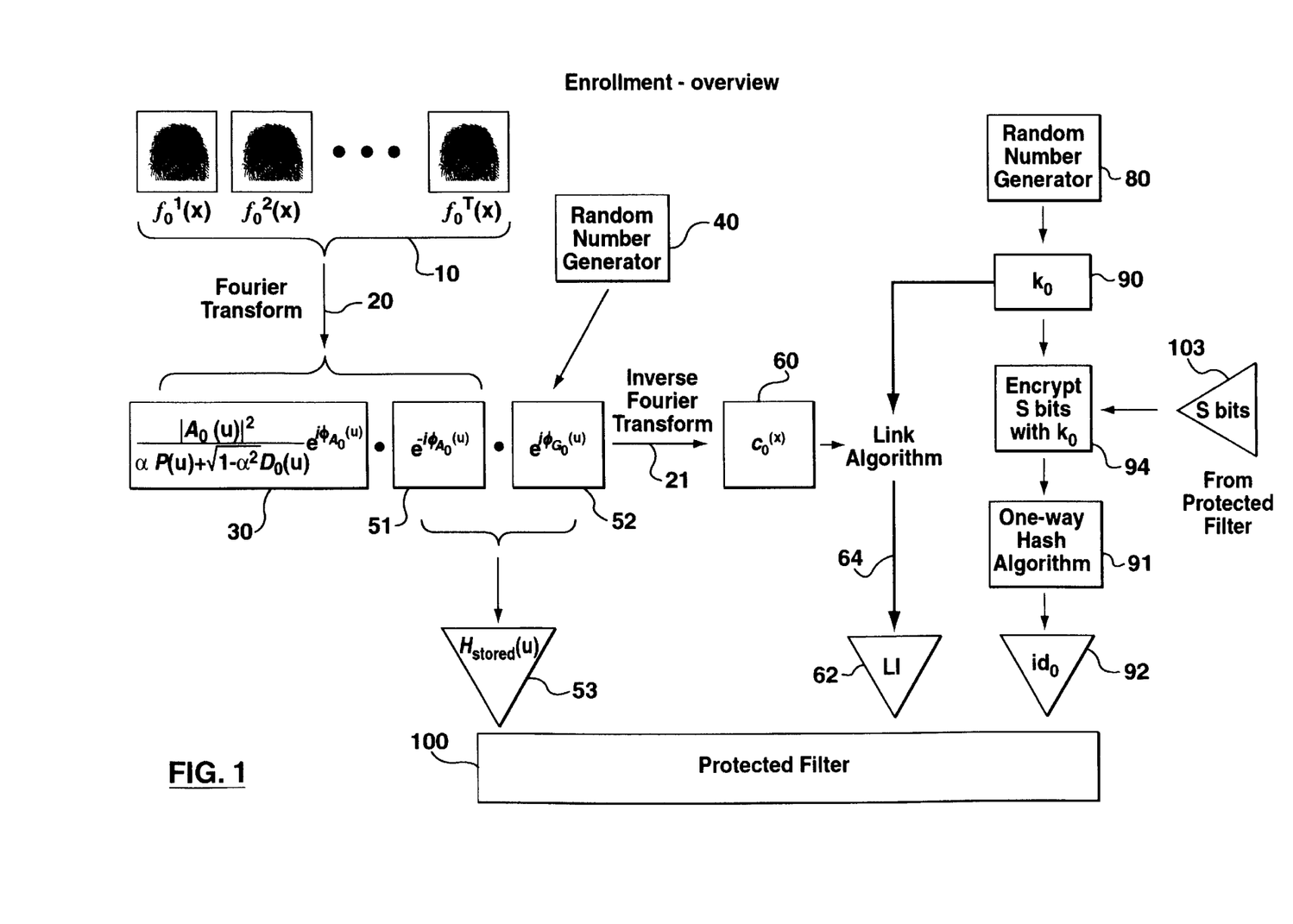
FIG. 1 presents a diagram of the enrollment process for producing a protected filter.

The biometric images comprising the training set are 128×128 dimensioned float or byte arrays.

With reference to FIG. 1, we specify, or use a random number generator, 80, to generate, an M-bit key, $k_0$, 90, as is required by the encryption or other system. One example of such a random number generator is the Blum-Blum-Shub (BBS) generator.

Using a random number generator, 40 (possibly distinct from 80), generate a 128×128 dimensioned array $$e^{i\phi_{G_0}(u)},$$

52, as defined above in equation (15).

Use the training set of data, $\{f_0^1(x), f_0^2(x), \ldots, f_0^T(x)\}$, 10, to produce the expressions of boxes 30 and 51. Combine the expressions of boxes 30 and 51 with $$e^{i\phi_{G_0}(u)},$$

52, to derive $c_0(x)$, 60, using equation (19).

Store the product of the phase-only function $$e^{i\phi_{G_0}(u)},$$

52, and $$e^{-i\phi_{A_0}(u)},$$

51, as $H_{stored}(u)$, 53, as defined by equation (21).

Determine a set of S bits, 103, from $H_{stored}(u)$, 53, which will be unique for each individual. Using the supplied key $k_0$, 90, as an encryption key, encrypt this set of S bits, 103, using an encryption algorithm, 94, e.g. IDEA. The output from this algorithm is then used as the input to a one-way hash algorithm, 91, e.g. SHA. The output of the hash algorithm is used as an identification code, $id_0$, 92.

The output $c_0(x)$, 60, is a 128×128 complex-valued array.

Figure 2:
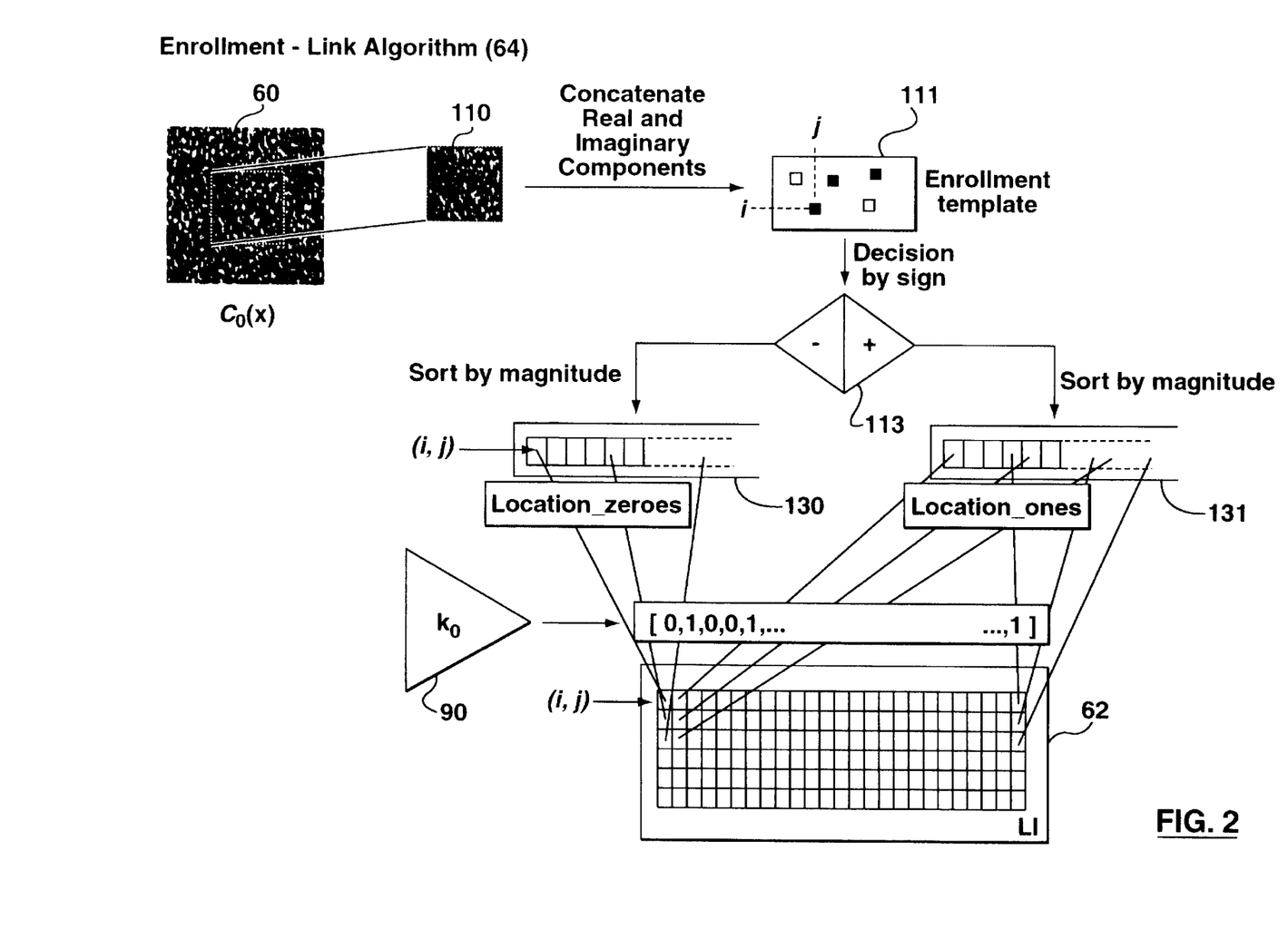
FIG. 2 presents a diagram of a method to link an output plane with a digital key on enrollment.

Referencing FIG. 2, a link algorithm, 64, used to link elements from $c_0(x)$, 60, with $k_0$, 90, is defined by the following steps:

First, extract the central 64×64 portion of $c_0(x)$ to produce an array, 110.

Next, concatenate the real and imaginary parts of array, 110, to form an enrollment template, 111, of dimension 128×64, i.e. an array with 128 columns and 64 rows. For example, if at position x, y of the 64×64 portion of $c_0(x)$ the element a+bi appears, then, in the enrollment template 111, element a will appear at position x, y and element b will appear at position (x+64), y.

The elements of the enrollment template, 111, are then sent into the decision box, 113, which sorts the elements by sign. Note that the negative elements from 111 will eventually represent '0 valued' elements of the key, $k_0$, while positive elements from 111 will be used to represent '1 valued' elements of $k_0$.

The negative elements are then ranked in descending order according to their magnitude and the indices of the ranked elements (i.e. the row and column of each ranked element in the enrollment template) are stored in the vector Location_zeroes, 130. The same procedure is then executed for the positive elements of 111 in which the indices of the ranked elements are stored in the vector Location_ones, 131. Notice that the names of these vectors have been chosen due to their eventual relation with the bits of the key as noted above.

The value M represents the length of the requested key, $k_0$, 90. Let $M_0$ represent the number of 0's in $k_0$, 90, and let $M_1$ represent the number of 1's. Retain then the first $M_0 \times L$ elements of Location_zeroes, 130, and the first $M_1 \times L$ elements of Location_ones, 131.

For each of the M-bits in the requested key, $k_0$, 90, sequentially or randomly extract L elements from either the first $M_0 \times L$ elements of Location_zeroes, 130, or the first $M_1 \times L$ elements of Location_ones, 131, depending on whether the requested bit was a zero or a one, respectively. The L elements extracted for key bit m, form the $m^{th}$ column of a Link Index array, LI, 62, with M columns and L rows. The elements of LI, 62, thus form the link index "lookup-table" for the elements of the enrollment template, 111, that have been chosen to represent the key, $k_0$, 90. Note that it has been observed that the probability of an error in each key bit is inversely proportional to the rank of the constituent bits. The rank was determined based on the distance of the point of the enrollment template from either the real or imaginary axes, i.e. the distance of the point from zero, depending on whether that point comes from the real or the imaginary part, respectively. Therefore, we may choose the L elements in an interleaving manner as presented in FIG. 2, such that the probability of error in each of the M key bits is homogenized. However, the elements may also be chosen randomly so as to minimize the information given to the attacker. Note also that for an M-bit key, the maximum value of L should be limited, so that all valid combinations of the key are supported by the available elements of the enrollment template (the requested key permutation has to be supported by the available number of zeroes and ones in the enrollment template).

Store the protected filter, which comprises $H_{stored}(u)$, 53, the Link Index array, LI, 62, and the ID-code, $id_0$, 92. The protected filter may also contain the value of $\alpha$ and/or the function of P(u), unless they are universal to the system.

2.2) Verification

Figure 3:
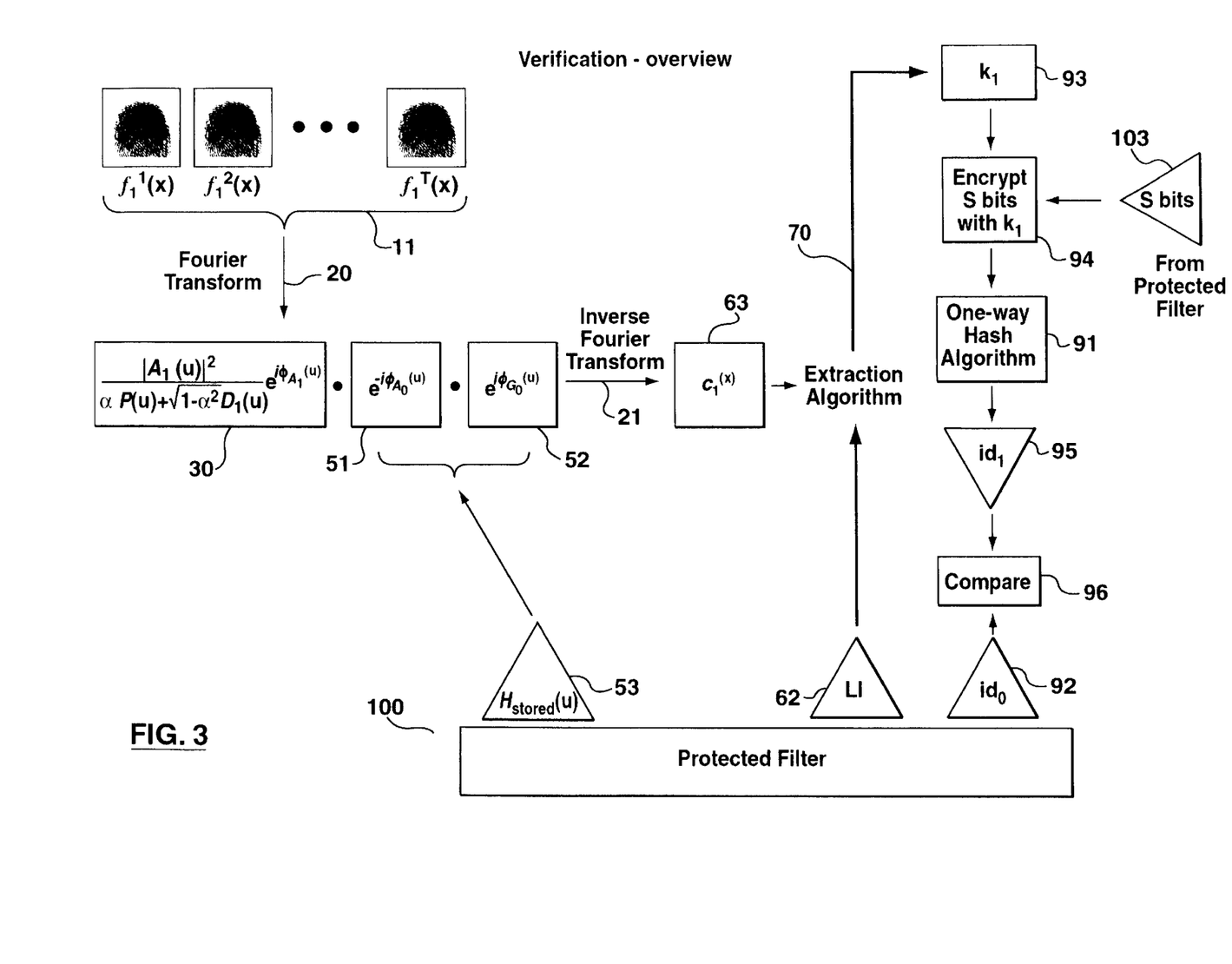
FIG. 3 presents a diagram of the verification process for secure key extraction.

With reference to FIG. 3, $H_{stored}(u)$, 53, LI, 62, $id_0$, 92, and, where necessary, $\alpha$ and/or P(u) are read in from the protected filter.

Using the non-training, or verification, set of inputs, $\{f_1^1(x), f_1^2(x), \ldots, f_1^T(x)\}$, 11, along with the values of $\alpha$ and P(u), calculate the term in the expression of box 31. Use the term of box 31 with $H_{stored}(u)$, 53, to calculate $c_1(x)$, 63, using equation (20), i.e.;

$$c_1(x) = FT^{-1}\left\{\frac{|A_1(u)|^2}{\alpha P(u) + \sqrt{1-\alpha^2}\, D_1(u)} e^{i\phi_{A_1}(u)} H_{stored}(u)\right\} \quad (22)$$

Figure 4:
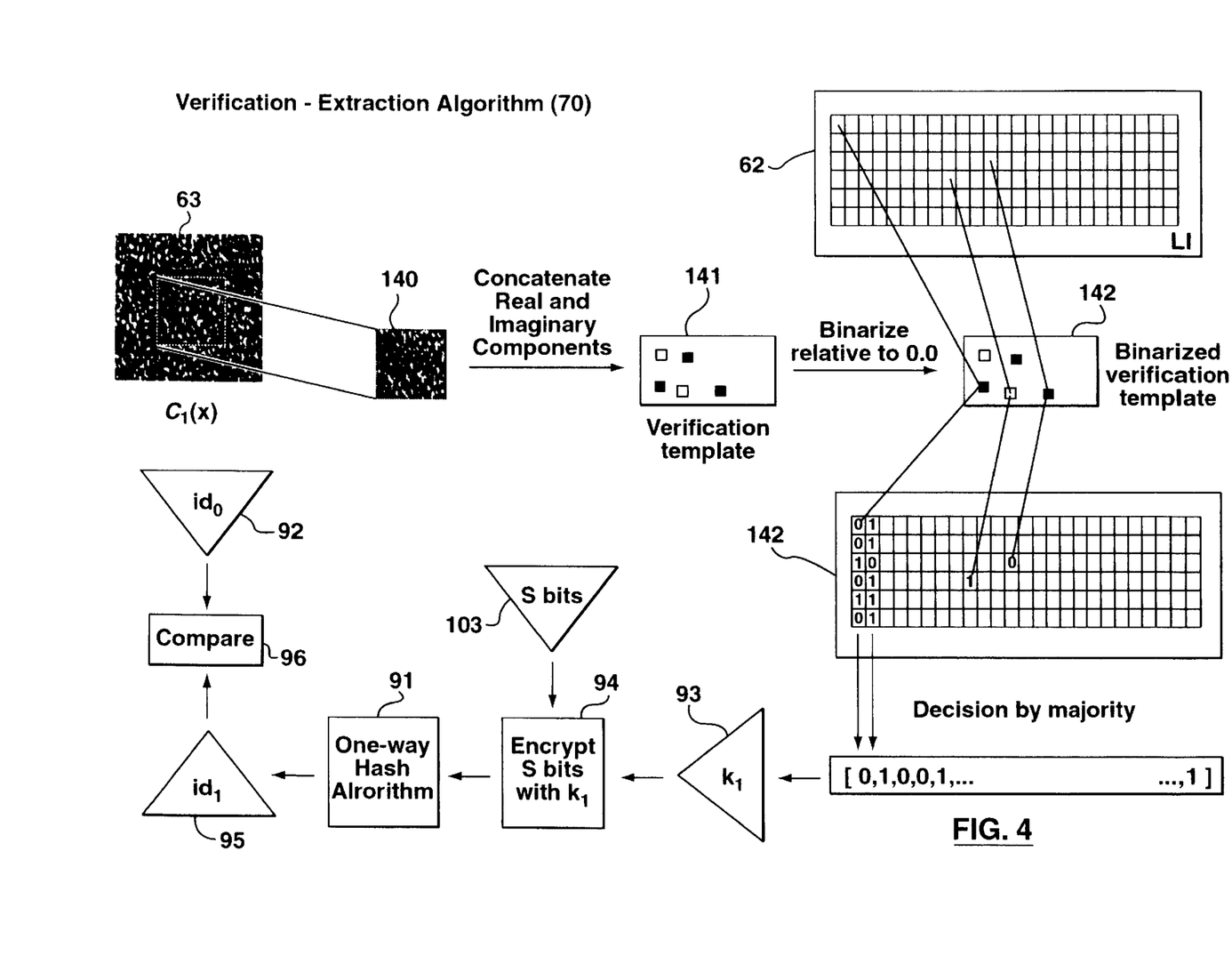
FIG. 4 presents a diagram of a method to extract the key on verification.

With reference to FIG. 4, extract the central 64×64 portion of $c_1(x)$, 63, to produce an array, 140. Concatenate the real and imaginary parts of 140 to form a verification template, 141, of dimension 128×64.

Binarize each element of the verification template, 141, independently by thresholding relative to zero, to produce a binarized verification template, 142, of dimension 128×64.

Define $k_1$, 93, as an M-element vector, and use the following steps to extract the elements of $k_1$ from the binarized verification template, 142, and the Link Index, 62.

For the $m^{th}$ element of $k_1$, 93, sum all of the bits of the binarized verification template whose indices are specified by the $m^{th}$ column of LI, 62. The value of the mth element of $k_1$, 93, is set to one if the sum of the bits is greater than or equal to L/2, and set to zero otherwise.

Obtain the same set of S bits, 103, from $H_{stored}(u)$ as was used in the enrollment process, and, using $k_1$, 93, as an encryption key, encrypt these bits with $k_1$ using an encryption algorithm, 94. The output of this algorithm is used as the input to the one-way hash algorithm, 91. The output of this hash algorithm is the ID-code $id_1$, 95. This code $id_1$, is then compared, 96, with the $id_0$, 92, obtained from the protected filter. If there is a match, then release key, $k_1$, 93.

If $id_1$, 95, does not match $id_0$, 92, then extract the portion of $c_1(x)$, 63, that is offset from the centre by one pixel, and repeat the above process to obtain a new $id_1$, 95. Continue this process with all portions of $c_1(x)$ that are one pixel offset from centre, comparing $id_1$ with $id_0$ for each iteration (eight combinations, including diagonals). If at any point $id_1 \equiv id_0$ then cease the algorithm and release $k_1$ ($\equiv k_0$). If, for all locations, $id_1 \neq id_0$, then repeat the above process for extractions that are offset from centre by two pixels, and so on up to approximately sixteen pixel offsets. If $id_1 \neq id_0$ for all locations, then send a message to the system that verification has failed and thus no key has been released.

It will be clear to those skilled in the art that the above procedure is used as a "brute force" search to accommodate the relative translation of the fingerprint images between enrollment and verification. In general, it is observed that less than +/−16 pixels of translation in a 128×128 image can be achieved using a suitable jig to position the finger, and thus the range of translation accommodated by the above algorithm is sufficient.

It will be clear that the ID-code, $id_0$, may also be stored at a secure location outside the protected filter. In this case, during verification, a new ID-code, $id_1$, is sent to that location and compared with $id_0$. This will improve the system security in that an attacker trying to retrieve the key, $k_0$, from the protected filter will not have access to $id_0$, and thus can only know whether his/her efforts were successful via messages sent from the secure location and controlled by the system administrator. Hence, the system administrator may limit the number of consecutive failed comparisons between $id_1$ and $id_0$ so that an attacker cannot assemble a large database of fingerprints and use them to attempt to produce the correct key, $k_0$.

While it is not stated in the preferred embodiment, it will be clear to those skilled in the art that $H_{stored}(u)$ may be stored as an array of quantized elements, where each element is one of a limited number, such as sixteen, of phase-levels.

It will be obvious to those skilled in the art that the above algorithm could also be used to accomplish verification of a system user, without release of a key. This can be achieved, for example, by storing the function, $c_0(x)$, in the verification system. Then, when the user verifies the system produces $c_1(x)$, which is then compared with $c_0(x)$ by, for example, summing the Euclidean distance between each of the elements of the two arrays to obtain a single scalar value which describes the similarity between $c_{1(x)\ and\ c0}(x)$. Alternatively, correlation could be used to judge the similarity between $c_1(x)$ with $c_0(x)$, and the ratio of correlation peak height divided by the total correlation plane energy could be used as the scalar value. This scalar value is then compared with a pre-determined system threshold and the user is either accepted or rejected by the system. If $c_0(x)$ can remain secure then it would be very difficult for an attacker to defeat such a system by generating an artificial $c_1(x)$ and obtaining a positive verification signal.

While the preferred embodiment describes a "brute-force" method of aligning the $c_1(x)$ pattern relative to the $c_0(x)$ by extracting different sections of $c_1(x)$, it will be obvious to those skilled in the art that other methods for aligning $c_1(x)$ relative to $c_0(x)$ may be used. For example several minutia points from the biometric could be stored in the protected filter and used to pre-align $c_1(x)$ relative to $c_0(x)$, prior to the extraction of the constituent bits. Another method would reserve some of the bits of the enrollment template to be linked with a system-specified synchronization signal. During verification, the binarized verification template is searched for the specified synchronization signal, and once located, is used to align $c_1(x)$ relative to $c_0(x)$.

Although the above embodiment sums the constituent bits from the binarized verification template with uniform weights, it will be obvious to those skilled in the art that various weighting functions could be used to further enhance performance of the system. As an example, the constituent bits could be weighted according to the inverse rank of each bit and summed. The constituent bits could also be weighted inversely proportional to the expected standard deviation of each bit before being added. Furthermore, the magnitude vectors could be added together using complex weights, comprising an amplitude term such as the standard deviation, and a phase term, which is added to the phase of each element and which is defined by the conjugate of the phase of that element in the enrollment template. For a legitimate user, this phase "correction" will provide a magnitude vector summation along the real axis. The summation will thus be far from the origin. For an attacker, the phase of the verification template will be random with respect to the legitimate user enrollment template. Because of this, the complex weights will not cancel the phase terms and the summation of the magnitude vectors should collapse to zero. The idea here is to force the legitimate user's summation to be far from the binarization threshold (i.e., zero on the real axis), while the attacker's summation is random about the binarization threshold.

It will be obvious to those skilled in the art that error-correcting codes, such as Hamming codes and Reed-Solomon codes, may be used to reduce the number of errors in the digital key, k. This would be achieved, for example, by using the constituent bits of the binarized verification template to derive N bits of data (where N>M), and then using error-correcting codes to transform the N encoding bits to the M key-bits.

It will be obvious to those skilled in the art that the preferred embodiment allows for periodic updating of the protected filter. For example, consider that the set of training images for a particular user, $f_0^1(x), f_0^2(x), \ldots, f_0^T(x)$, is stored in a secure location, and is available to a system administrator (perhaps, as a privacy/security measure, only after the legitimate user has verified). When this user presents a subsequent set of images, $f_1^1(x), f_1^2(x), \ldots, f_1^S(x)$, to the system, the system administrator may combine this new set of images with the previous set to form a new set of T+S images which may now be considered as an updated set of training images. Using this inclusive set of T+S images, $H_{stored}(u)$ and $c_0(x)$ can be regenerated (using a new version of $G_0(u)$), and a new linking index array, LI, determined. The new versions of $H_{stored}(u)$ and LI should be stored in the protected filter. This process may be considered as "adaptive filtering", as the contents of the protected filter are adapted over time to encompass more of the natural variations of the biometric image than could be encompassed in a single enrollment session.

It is also obvious that any time a new set of images is acquired, the key, $k_0$, may be modified, if necessary. In this case $id_0$ should be modified in the protected filter. Updating the key has several benefits. For example, if it is known that $k_0$ has been compromised, then a new key should be introduced into the system. Also, if it is known that an attacker can establish the value of a key within a certain period of time, for example by using a brute-force computational search, then the value of the key should be updated within this period of time. Updating the value of the key periodically is a standard procedure used in cryptographic and other security systems, and it is evident that this is easily achieved using the methods described herein.

3) Other Embodiments of the Invention

A second embodiment of the invention deals with minutiae-based fingerprint verification techniques. It has been known for more than 100 years that the minutiae are unique and reasonably robust characteristics of a fingerprint. Classical minutiae are defined as fingerprint ridge endings (type 1 minutiae) and fingerprint ridge bifurcations (type 2 minutiae). It is obvious that the type 1 minutiae may be also defined as fingerprint groove bifurcations and the type 2 minutiae—as groove endings. There are also some other fingerprint characteristics which are sometimes referred to minutiae, such as rods, pores, bridges, islands, line breaks, etc., but they are usually unstable and irreproducible in subsequent attempts. These characteristics often produce false minutiae, or fingerprint noise, because they may be deemed real minutiae during fingerprint verification. For the past 20 years, many algorithms for automatic minutiae extraction have been developed. The strength of these methods is in a fingerprint identification, or so-called "one-to-many" systems, because they allow a fast comparison of a fingerprint to be identified against a huge database with a relatively low false acceptance. However, one of the major drawbacks of the minutiae methods is that they require fingerprints of a high quality and without large scars. This explains the fact that most minutiae methods have a minimum false rejection rate of at least a few per cent in a real-life test.

For the key management in this embodiment, we use one of the known minutiae extraction algorithms (see, for example, U.S. Pat. No. 4,752,966 to Schiller incorporated herein by reference). The algorithm scans a fingerprint image and finds a horizontal and vertical, x and y, positions of the minutiae, their orientation angles, θ, and identifies them as types, 1 or 2. To improve the consistency of the minutiae extraction, we may use a few fingerprints both in enrollment and in verification. In one method, the minutiae are tested for their stability: if the same minutia is found, for example, in at least 4 attempts from 5 in total, this minutia will be retained, otherwise, it is considered unstable and dropped. In another method, all minutiae found in 5–6 attempts are retained for further processing. There might be also an intermediate method, which allows us to tune the system tolerance. At the end of the minutiae extraction process there are usually from 5–7 to 30–50 minutiae found in the fingerprint, depending on the method of the extraction and properties of a particular fingerprint.

At the next step a feature array, $f(x,y,\theta)$, is formed in a 3D feature space which includes x, y minutiae coordinates and their angles. In a preferred embodiment, x and y are sampled by 64 pixels each and θ is sampled by 16 levels from (-π) to π, thus the total number of pixels is 64×64×16=65536. If a minutia occupies a particular cell $(x_0,y_0,\theta_0)$ in the feature space, then the function $f(x_0,y_0,\theta_0)=1$ if the minutia is of type 1 and $f(x_0,y_0,\theta_0)=-1$ for the type 2 minutiae. Finally, $f(x_0,y_0,\theta_0)=0$ if the minutia in this cell.

After the function $f(x,y,\theta)$ is determined, a 3D Fourier transform is performed to obtain a 3D complex function $F(u,v,\Theta)$. We prefer the Fourier transform to any other transform because it provides translation-invariant verification. Moreover, because we use the minutiae angle as a third coordinate, this embodiment is also rotationally invariant. In other words, if during verification a finger is placed into a different position and at a different angle, this will not significantly affect the performance of the method.

The next steps are very similar to those in the first embodiment. In enrollment, a 3D function, $G_0(u,v,\Theta)$, having unity magnitude and a random and uniform phase, is generated. Then we obtain an amplitude, $|F_0|$, and the phase, $$\phi_{F_0}(u, v, \Theta),$$

of the Fourier transform of the enrolled feature function, $f_0(x,y,\theta)$. The following two functions are calculated:

$$H_{stored}(u, v, \Theta) = G_0(u, v, \Theta)e^{-i\phi_{F_0}(u,v,\Theta)} \quad (23)$$

$$c_0(x, y, \theta) = FT^{-1}\{\hat{O}(|F_0(u, v, \Theta)|)G_0(u, v, \Theta)\} \quad (24)$$

It is known that a Fourier transform of a real object possesses a symmetry property, i.e. $F(u,v,\Theta)=F^*(-u,-v,-\Theta)$, which may give some additional information to an attacker having an access to $H_{stored}$. To improve the security of the method, only a half of the 64×64×16 array, $H_{stored}$, may be extracted and stored, that is, its dimensions will be, for example, 64×32×16.

The operator $\hat{O}$ in equation (24) processes the amplitude $|F_0|$ in order to improve the system tolerance. It may contain, for example, a saturation denominator like in the first embodiment (equation (19)).

The function $c_0(x,y,\theta)$ is used to encode an M-bit digital key, $k_0$. This is done via a link code and in the same manner as in the first embodiment. More particular, a central portion of $c_0(x,y,\theta)$ is extracted; for example, its size may be 32×32×10 or 32×16×10, if the noted half of $H_{stored}$ was stored. The real and imaginary parts of the extracted arrays are concatenated and binarized, thus the resulting array contains 20480 bits (or 10240, if the noted half was stored). The link code links each of the M bits in the key $k_0$ to L bits picked from the array of 20480 or 10240 elements. There may be some more sophisticated methods, including various error correcting codes. The stored protected filter comprises the phase-only function, $H_{stored}(u,v,\Theta)$, the data defining the link code, and the ID-code, $id_0$.

In verification, a feature function, $f_1(x,y,\theta)$, and its Fourier transform, $F_1(u,v,\Theta)$, are obtained in the same way as it was done in enrollment. The function $H_{stored}(u,v,\Theta)$ is read from the storage means, and a function $c_1(x,y,\theta)$ is calculated as $$c_1(x, y, \theta) = FT^{-1}\{\hat{O}(|F_1(u, v, \Theta)|)e^{-i\phi_{F_1}(u,v,\Theta)}H_{stored}(u, v, \Theta)\} \quad (25)$$

Here $$\phi_{F_1}(u, v, \Theta)$$

is a phase of the Fourier transform $F_1$. Then a central 32×32×10 portion (or 32×16×10 if the noted half of $H_{stored}$ was extracted during enrollment) of $c_1$ is extracted and sequentially scanned across $c_1$ until a correct key is retrieved or verification fails. Normally, the size of the box being scanned is 32×32×4 (32×16×4 for the half). However, if the minutiae extraction algorithm also determines a natural center of the fingerprint (usually this is a point of a maximum line curvature), this size can be made much smaller, for example, 4×4×4. This will significantly speed up the verification process. Using the link code, which is also read from the storage means, a decrypted key, $k_1$, is determined from the extracted portion of $c_1$. Then the hash value, $id_1$, is calculated from $k_1$ and compared with the stored value $id_0$. If they match, the correct key is released.

In a third embodiment of the invention, yet another method for obtaining a biometric information signal is used.

In enrollment, the information contained in a 2D fingerprint image, $f_0(x,y)$, is sorted into two parts: the most distinctive, $f_{0m}(x,y)$, and the least distinctive, $f_{0l}(x,y)$. The most distinctive information contains the areas (we call them "tiles") including minutiae, scars, places with a high line curvature, etc., in other words, the areas which do not have a parallel or quasi-parallel line structure. One of the methods for finding these areas is disclosed in U.S. Pat. No. 5,067,162 to Driscoll et al and is incorporated herein by reference. Another method may include any minutiae extraction algorithm, that is, after all minutiae have been found, the "tiles" from the original image containing the minutiae as centers are extracted. The least distinctive areas may be found in the opposite manner, that is, the "tiles" are located at the places where the lines are almost parallel and do not contain minutiae. For a 128×128 image, for example, the "tiles" could have dimensions of 16×16. Alternatively, the function $f_{0l}(x,y)$ may be taken as a straight strip at the bottom, at the top, at the right or the left side of the image, or as a combination of the above. In this case the information contained in $f_{0l}(x,y)$ should not necessarily be called least distinctive but rather the information retained for co-alignment.

The functions $f_{0m}(x,y)$ and $f_{0l}(x,y)$ are 128×128 images containing the "tiles" with the most or the least distinctive information, the pixels outside the "tiles" are set equal to 0 or to other pre-determined values. These "tiles" are located at the same places as they were in the original image $f_0(x,y)$. The most distinctive information is used for the key linking and is not stored into a protected filter, whereas the least distinctive information is used only to co-align a fingerprint to be verified with the enrolled fingerprint. The least distinctive information is stored into a protected filter.

During both enrollment and verification, a few versions of the same fingerprint may be used to improve its consistency, as it was described in the first embodiment. After a function $f_{0m}(x,y)$ is derived, a transformation, T, is performed to obtain a transform, $F_{0m}(u,v)$, of the most distinctive information:

$$F_{0m}(u,v) = T(f_{0m}(x,y)) \qquad (26)$$

In this embodiment, the transformation T is not necessarily a Fourier transform, it may be also a fractional Fourier transform, a Gabor transform, one of the wavelet transforms, etc. In other words, the transformation T should not necessarily yield a translation-invariant method, like the Fourier transform, because the images are co-aligned with the least distinctive information. In a preferred version of this embodiment, the remainder of the operations is almost the same as in the first embodiment. A random phase-only function, $G_0(u,v)$ is generated; the functions $$H_{stored}(u,v) = G_0(u,v)e^{-i\phi F_{0m}(u,v)} \qquad (27)$$

and $$c_0(x,y) = T^{-1}\{\hat{O}(|F_{0m}(u,v)|)G_0(u,v)\} \qquad (28)$$

are calculated, where $T^{-1}$ is an inverse transformation, and an operator processes the amplitude of $F_{0m}(u,v)$; a requested key, $k_0$, is linked to $c_0(x,y)$ via a link code. In this embodiment, the entire $c_0(x,y)$ array is used, not only a central part, which increases the amount of the available information and improves the performance.

A protected filter comprises $H_{stored}$, the link code, the least distinctive information $f_{0l}(x,y)$, the coordinates of the "tile" centers for the most distinctive information, and the ID code, $id_0$.

In verification, a new fingerprint image, $f_1(x,y)$, is obtained. The array $f_{0l}(x,y)$ containing the least distinctive information from the enrolled fingerprint is read from the protected filter. The array $f_{0l}(x,y)$ is used only to co-align the fingerprint images $f_0(x,y)$ and $f_1(x,y)$. To do that, a correlation function of two arrays, $f_{0l}(x,y)$ and $f_1(x,y)$, is calculated, and x and y positions of the correlation peak, $x_{cor}$ and $y_{cor}$, are determined. If the images $f_0(x,y)$ and $cf_1(x,y)$ were not shifted relatively to each other, the correlation peak would be located exactly at the center, i.e. at (64,64) in case of 128×128 images. The values ($x_{cor}$−64) and ($y_{cor}$−64) determine the relative shift of two images. Then the image $f_1(x,y)$ is shifted by these values to obtain a shifted image, $f_1'(x,y)$, so that the images $f_0(x,y)$ and $f_1'(x,y)$ are supposed to be co-aligned. At the next stage of the co-alignment, the "tiles" are extracted from $f_1'(x,y)$ at the same locations as the "tiles" containing the least distinctive information were extracted from $f_0(x,y)$ to obtain an image $f_{1l}'(x,y)$ which is supposed to be the same as $f_{0l}(x,y)$. Then a correlation function of $f_0(x,y)$ and $f_{1l}'(x,y)$ is calculated. If the correlation peak is located at (64,64), this means that the co-alignment was done correctly, otherwise, the image $f_1'(x,y)$ is shifted again to the new location of the correlation peak.

After the second stage of the co-alignment is completed, the coordinates of the "tile" centers for the most distinctive information are read from the protected filter, and "tiles" are extracted at the same locations from $f_1'(x,y)$ to obtain an array $f_{1m}'(x,y)$ which is supposed to coincide with the array $f_{0m}(x,y)$ extracted during enrollment. To improve the accuracy of the method, a few versions of the fingerprint $f_1(x,y)$ may be obtained during verification, and a few versions of the arrays $f_{1l}'(x,y)$ and $f_{1m}'(x,y)$ may be extracted. If some of the arrays $f_{1m}'(x,y)$ differ too much from the most of the arrays, these arrays will be rejected. Then a composite image, $f_{1m}(x,y)$, may be formed by adding together the remaining $f_{1m}'(x,y)$ arrays.

At the next step the transformation T of $f_{1m}(x,y)$ is performed to obtain a transform, $F_{1m}(u,v)$. A function $c_1(x,y)$ is obtained:

$$c_1(x,y) = T^{-1}\{\hat{O}(|F_{0m}(u,v)|)e^{i\phi F_{1m}(u,v)}H_{stored}(u,v)\} \qquad (29)$$

At the next step a key, $k_1$, is determined from $c_1(x,y)$ using the link code which was read from the protected filter. Then the hash value, $id_1$, is calculated from $k_1$ and compared with the stored value $id_0$. If they match, the correct key is released.

In this embodiment, the array $c_1(x,y)$ is not scanned, unlike the first and the second embodiments, because the images $f_1(x,y)$ and $f_0(x,y)$ are co-aligned. However, there may be an error of the co-alignment, usually in 1 or 2 pixels. In this case the co-aligned input image $f_1'(x,y)$ may be shifted by ±2 pixels in both x and y directions in order to obtain a few functions $f_{1m}(x,y)$ and try them all for the verifications.

A fourth embodiment of the invention deals with another type of biometric information: the eye's iris. It has been shown (see, for example, the article by J. Daugman, IEEE Trans. on Pattern Analysis and Machine Intelligence, Vol.15, No.11, p.p.1148–1161, 1993 incorporated herein by reference) that the iris scan is quite an accurate and reliable method for biometric verification and identification. There are two important advantages of the iris scan to fingerprint-based biometrics. First, the iris has a circular shape and, thus, a natural center, which solves the problem of the co-alignment of images. Second, the iris reading is free of mechanical contact, which allows to capture the iris image without irregular distortions. However, the image quality sometimes is poor, especially for dark irises.

In enrollment for the key management, the first step includes receiving a 2D iris image, pre-processing, and transforming the image to dimensionless projected polar coordinate system $(r, \theta)$ to obtain a processed iris image, $i_0(r, \theta)$. During both enrollment and verification, a few versions of the same iris may be used, similar to all previous embodiments.

The next step includes performing a transformation of $i_0(r, \theta)$ to obtain a transform, $I_0(R,\Theta)$. In this embodiment, this is a Gabor transform, $$I_0(R,\Theta) = \int\int \exp[-i\omega(\Theta-\theta)-(R-r)/a^2-(\Theta-\theta)/b^2]i_0(r,\theta)r dr\, d\theta \quad (30)$$

where the parameters $\omega$, a, and b have been pre-determined. Unlike the Fourier transform, the magnitude of the Gabor transform is not translation-invariant, but this property of the transform is not needed for this embodiment because the images are co-aligned by their natural center.

Then the real and imaginary parts of $I_0(R,\Theta)$ are concatenated and binarized (with respect to a threshold equal to 0) to obtain a binary function, $BI_0(R,\Theta)$. At the next steps, a random binary function, $BG_0(R,\Theta)$, is generated; the key $k_0$ is linked to $BG_0(R,\Theta)$ via a link code, and a binary stored function is $$H_{stored} = BI_0(R,\Theta) \text{ XOR } BG_0(R,\Theta) \quad (31)$$

A protected filter comprises $H_{stored}$, the link code, and the ID code, $id_0$.

In verification, a new processed iris image, $i_1(r, \theta)$, is obtained. Then the Gabor transform is performed, and the real and imaginary parts of its result are concatenated and binarized to obtain a binary function, $BI_1(R,\Theta)$. The function $H_{stored}$ is retrieved from the protected filter, and a binary function, $BG_1(R,\Theta)$, is obtained:

$$BG_1(R,\Theta) = BI_1(R,\Theta) \text{ XOR } H_{stored} \quad (32)$$

At the next step, a decrypted key, $k_1$, is determined from $BG_1(R,\Theta)$ using the link code which was read from the protected filter. Then the hash value, $id_1$, is calculated from $k_1$ and compared with the stored value $id_0$. If they match, the correct key is released.

One can note that the method for the key linking and retrieval of the fourth embodiment may be considered as a limiting and simplified case of the first embodiment. Because the irregular distortions for the iris images are much less significant than for the fingerprint images, we may neglect the noise term, $E_{noise}$, in equation (5) by putting $\alpha=0$. Then, if the enrolled images $f_0'(x)$ are approximately identical, it follows from the equations (11) and (12) that $A_0(u) \cong F_0'(u)$, $D_0(u) \cong |F_0'(u)|^2$. The same is also true for the images in verification, $f_1(x)$, that is, $A_1(u) \cong F_1(u)$, $D_1(u) \cong |F_1(u)|^2$. Substituting these results into equations (19) and (20), we obtain:

$$c_0(x) = FT^{-1}\{e^{i\phi_{G_0}(u)}\} \quad (33)$$

$$c_1(x) = FT^{-1}\{e^{i\phi_{A_1}(u)}e^{-i\phi_{A_0}(u)}e^{i\phi_{G_0}(u)}\}$$

This means that only the phase information has left, and the amplitudes $|A_0(u)|$, $|A_1(u)|$ of the transform of the composite images are not important anymore for the distortion-free images. Note that the function $H_{stored}$ is still defined by the equation (21). As it was aforementioned, the translation invariance of the algorithm is not needed for the iris images, thus an inverse transform may be omitted in equations (33) and the key $k_0$ may be linked directly to $G(u)$ in the transformed domain, u, rather than to $c_0(x)$ in the image domain, x. Finally, if we quantize the phases in equations (33) by 4 levels, namely, $\pi/4$, $3\pi/4$, $5\pi/4$, and $7\pi/4$, all the complex exponents will have the real and imaginary parts equal to $$\pm\frac{1}{\sqrt{2}}.$$

Dropping the factor $\sqrt{2}$ and concatenating the real and imaginary parts, we obtain an array consisting of elements equal to ±1. It is obvious that the product of such arrays is equivalent to the logical XOR operation applied to binary arrays containing zeros and ones only, where the values of −1 and +1 are mapped to 1 and 0, respectively. All these reasonings lead directly to the equations (31) and (32) of the fourth embodiment.

It is obvious that in the fourth embodiment the key management may be also done in a manner similar to the previous embodiments, that is, via a function $c_0(r, \theta)$ and an inverse Gabor (or any other) transform, like in equation (28). The function $H_{stored}$ would not be a binary but a phase-only function.

It is also obvious that the third embodiment of the invention may be also done similarly to the fourth embodiment, that is, by binarizing the function $F_{0m}(u,v)$ and creating $H_{stored}$ via the XOR operation, like in equation (31). This would especially make sense if a fingerprint input device were able to produce distortion-free images. In general, the fourth embodiment may be implemented for any distortion-free biometric with co-aligned images.

While the first three embodiments utilized fingerprint images, and the fourth utilized iris images, it is obvious that other biometric images could be also used with all embodiments.

It will be obvious to those skilled in the art that although the preferred embodiments are implemented in an entirely digital environment, it will be possible to implement components of the algorithm through other means, such as optical information processing.

Other modifications will be apparent to those skilled in the art and, therefore, the invention is defined in the claims.

What is claimed is:

1. A method for securely recovering a digital key, comprising:
   capturing at least one biometric image;
   obtaining transformed image information comprising transforming said at least one biometric image to a transform domain;

retrieving a protected filter from storage, said protected filter comprising a phase-only filter and linking information, said phase-only filter generated from a random phase-only function and other phase information to obtain cryptographic secrecy, that is, given the phase-only filter, neither the random phase-only function nor the other phase information can be reconstructed other than by a brute force search, said linking information generated at least in part, from said random phase-only function and from a digital key;

applying said transformed image information to said phase-only filter to obtain verification information; and applying said linking information to a function of said verification information to obtain said digital key.

2. The method of claim 1 wherein said obtaining verification information comprises:

obtaining magnitude information from said transformed image information;

applying at least said magnitude information to said phase-only filter to obtain a transitory filter with phase and magnitude information; and multiplying said transformed image information with said transitory filter.

3. The method of claim 1 wherein said verification information comprises a complex valued array and, further comprising to obtain a function of said verification information:

(i) obtaining a transform of said verification information;
(ii) taking an array which is at least a portion of said transform of the verification information;
(iii) concatenating real and imaginary parts of said taken array to form a verification template; and
(iv) binarizing said verification template by thresholding relative to zero.

4. The method of claim 3 wherein said key has binary elements and said linking information is an array having a predetermined number of rows and a column for each binary element of said key, and wherein said obtaining a key comprises:

obtaining an $m^{th}$ element of said key by summing all bits of said binarized verification template whose indices are specified by an $m^{th}$ column of said linking array a value of the $m^{th}$ element of said key being set to one if said sum is greater than or equal to one-half said number of rows of said linking array and, otherwise said $m^{th}$ key element being set to zero.

5. The method of claim 4 further comprising retrieving a set of bits, encrypting said bits with said key, passing said encrypted bits through a one-way hash algorithm to obtain a key identifier, comparing said obtained key identifier with a retrieved key identifier and, on a match, releasing said key.

6. The method of claim 5 wherein, if said obtained key identifier does not match said retrieved key identifier, taking an array which is a different portion of said verification information from the array of (ii) of claim 3 and repeating from (iii) of claim 3.

7. The method of claim 1 wherein said obtaining transformed image information comprises applying an optimization procedure dependent upon desired discrimination and distortion tolerance.

8. The method of claim 1 wherein said transform domain is a Fourier transform domain.

9. A method for securely storing a digital key, comprising:

capturing at least one biometric image;

obtaining transformed image information comprising transforming said at least one biometric image to a transform domain;

generating a random phase-only function;

utilizing said transformed image information and said random phase-only function to generate a phase-only filter having cryptographic secrecy, that is, given the phase-only filter, neither the transformed image information nor the random phase-only function can be reconstructed other than by a brute force search;

applying said random phase-only function to said transformed image information to obtain enrollment information;

utilizing a digital key and said enrollment information to obtain linking information to said key; and storing a protected filter, said protected filter comprising said phase-only filter and said linking information.

10. The method of claim 9 wherein said key has M elements and wherein the obtaining linking information to said digital key comprises:

(i) obtaining a transform of said enrollment information;
(ii) concatenating real and imaginary pans of at least a portion of said transform of said enrollment information to form an enrollment template;
(iii) ranking positive elements and negative elements of said enrollment template by magnitude;
(iv) storing row and column indices of said ranked positive elements in a positive locations vector and row and column indices of said ranked negative elements in a negative locations vector; and
(v) for each one of the M elements of said key, extracting L elements from said negative location vector if said one key bit is a zero and extracting L elements from said positive location vector if said one bit is a one to generate a two-dimensional link array having L rows and M columns.

11. The method of claim 9 further comprising retrieving a set of bits, encrypting said bits with said key, passing said encrypted bits through a one-way hash algorithm to obtain a key identifier, and storing a protected filter, said protected filter comprising said phase-only filter, said linking information, and said key identifier.

12. The method of claim 9 wherein said obtaining transformed image information comprises applying an optimization procedure dependent upon desired discrimination and distortion tolerance.

13. The method of claim 9 wherein the applying said phase-only function to said transformed image information comprises applying magnitude information from said transformed image information to a product of the phase component of said transformed image information and said phase-only function.

14. The method of claim 9 wherein said transform domain is a Fourier transform domain.

15. The method of claim 9 wherein said biometric image is a fingerpint image and wherein the obtaining transformed image information comprises the steps of:

scanning said fingerprint image to obtain a minutiae template, said minutiae template comprises vertical and horizontal minutiae coordinates, minutiae angles, and minutiae types;

obtaining multi-dimensional feature array from said minutiae template; and performing a transform of said feature array.

16. The method of claim 1 wherein said biometric image is a fingerprint image and wherein said obtaining transformed image information comprises:

scanning said fingerprint image to obtain a minutiae template, said minutiae template comprises vertical and horizontal minutiae coordinates, minutiae angles, and minutiae types;

obtaining multi-dimensional feature array from said minutiae template; and performing a transform of said feature array.

17. The method of claim 9 wherein the obtaining transformed image information comprises the:

sorting information contained in said biometric image into key-related biometric information and alignment information;

performing a transform of a function of said key-related biometric information; and wherein said protected filter includes said alignment information.

18. The method of claim 1 wherein said protected filter includes alignment information, and wherein the obtaining transformed image information comprises:

retrieving said alignment information from said protected filter;

utilizing said alignment information to align said at least one biometric image to obtain at least one aligned biometric image;

retrieving key-related biometric information from said aligned biometric image; and performing a transform of a function of said key-related biometric information to obtain said transformed image information.

19. The method of claim 9 wherein said biometric image has a natural alignment feature and wherein the obtaining transformed image information comprises the steps of:

aligning said at least one biometric image utilizing said natural alignment feature to obtain at least one aligned image; and performing a transform of a function of said aligned image.

20. The method of claim 9 wherein said phase-only filter is quantized to at least two levels of phase.

performing a transform of a function of said aligned image.

21. The method of claim 1 wherein said phase-only filter is a binary filter and wherein said transformed image information comprises binary transformed image information; and wherein said obtaining verification information comprises performing an XOR operation between said binary filter and said binary transformed image information.

22. A method for secure user verification, comprising:

capturing at least one biometric image;

obtaining transformed image information comprising transforming said at least one biometric image to a transform domain;

obtaining verification magnitude information from said transformed image information;

retrieving a filter from storage, said filter being a phase-only filter which has no magnitude information;

applying at least said verification magnitude information to said phase-only filter to obtain a transitory filter with phase and magnitude information;

multiplying said transformed image information with said transitory filter to obtain verification information; and comparing said verification information with a retrieved reference pattern and, on obtaining a satisfactory match, providing a user verification signal.

23. The method of claim 1 wherein said other phase information is derived from a phase component of transformed enrolment image information, said transformed enrolment image information obtained from transforming at least one enrolment biometric image to a transform domain.

24. The method of claim 23 wherein said other phase information comprises the complex conjugate of a phase component of said transformed enrolment information and wherein said phase-only filter is generated by multiplying said complex conjugate with said random phase-only function.

25. The method of claim 1 wherein said random phase-only function is uniformly distributed.

26. The method of claim 9 wherein said random phase-only function is uniformly distributed.

27. The method of claim 9, wherein said generating said phase-only filter comprises:

obtaining the complex conjugate of the phase component of said transformed image information; and multiplying said phase-only function with said complex conjugate to generate said phase-only filter.

28. The method of claim 1 wherein said key has elements and said linking information comprises a linking array having a pre-determined number of rows and a column for each element of said key.

* * * * *

UNITED STATES PATENT AND TRADEMARK OFFICE
CERTIFICATE OF CORRECTION

PATENT NO.   : 6,219,794 B1                                          Page 1 of 1
DATED        : April 17, 2001
INVENTOR(S)  : Colin Soutar et al.

It is certified that error appears in the above-identified patent and that said Letters Patent is hereby corrected as shown below:

<u>Column 21, claim 1,</u>
Line 9, replace "generated at least" with -- generated, at least --.

<u>Column 21, claim 4,</u>
Line 40, replace "predetermined" with -- pre-determined --.

<u>Column 22, claim 10,</u>
Line 25, replace "imaginary pans of" with -- imaginary parts of --.

<u>Column 23, claim 20,</u>
Lines 48-49, delete "performing a transform of a function of said aligned image".

Signed and Sealed this

Eighth Day of January, 2002

Attest:

*Attesting Officer*

JAMES E. ROGAN
*Director of the United States Patent and Trademark Office*